(12) United States Patent
Givord et al.

(10) Patent No.: US 7,470,740 B2
(45) Date of Patent: Dec. 30, 2008

(54) PEELABLE HOT MELT ADHESIVE

(75) Inventors: Roland Givord, Gleize (FR); Eric Rozier, Saint Didier de Formans (FR); Viviane Coquard, Saint Jean d'Ardieres (FR)

(73) Assignee: Henkel AG & Co. KGaA (DE)

( * ) Notice: Subject to any disclaimer, the term of this patent is extended or adjusted under 35 U.S.C. 154(b) by 417 days.

(21) Appl. No.: 11/364,301

(22) Filed: Feb. 28, 2006

(65) Prior Publication Data

US 2006/0241235 A1 Oct. 26, 2006

(30) Foreign Application Priority Data

Mar. 11, 2005 (EP) .................................. 05005358

(51) Int. Cl.
*C08L 53/00* (2006.01)
*C08K 3/26* (2006.01)
*C08K 5/01* (2006.01)

(52) U.S. Cl. ........................ 524/505; 524/425; 525/88; 156/334

(58) Field of Classification Search ................. 524/425, 524/505; 525/88; 156/334
See application file for complete search history.

(56) References Cited

U.S. PATENT DOCUMENTS 6,303,684 B1   10/2001  Suzuki et al.
6,767,424 B1 *  7/2004  Butterbach et al. .......... 156/245

FOREIGN PATENT DOCUMENTS

WO    WO 02/31044 A1 *  4/2002
WO    WO 02/074873 A1 *  9/2002

OTHER PUBLICATIONS

Kuraray Europe GmbH—Intrinsic Viscosity of Septon grades—2 pgs, dated Sep. 2004.
Fortum Brochure—Hydroisomerized base stocks—Nexbase TM 3000—8 pgs, undated.

* cited by examiner

*Primary Examiner*—Fred M Teskin

(57) ABSTRACT

A hot melt adhesive comprising a thermoplastic elastomer, a tackifying resin and a plasticizer. The adhesives are particularly useful in automotive applications.

11 Claims, No Drawings

PEELABLE HOT MELT ADHESIVE

FIELD OF THE INVENTION

The present invention relates to hot melt adhesive compositions, and more particularly to hot melt adhesives and their use in automotive applications.

BACKGROUND OF THE INVENTION

Hot melt adhesives are widely used for various commercial and industrial applications such as product assembly and packaging. Such hot melt adhesives are applied to a substrate while in its molten state and cooled to harden the adhesive layer.

Most commercially available hot melt adhesives do not provide the necessary properties required for automotive uses. For example, conditions encountered by hot melt adhesives during automotive uses are extremely harsh and include exposure to temperatures ranging from −30° C. to 120° C. and environments that contribute to oxidation. Thus, a hot melt adhesive for automotive applications must provide good thermal stability, a low Tg, oxidation resistance and, preferably, a low volatiles content.

Accordingly it would be desirable to have thermoplastic elastomer-based adhesives that exhibit good bond strength with exceptional toughness, tensile strength and application viscosity under extreme environmental conditions. The current invention addresses this need in the art.

SUMMARY OF THE INVENTION

The invention provides an adhesive that can be formulated for applications in the harsh conditions encountered with automotive uses, yet still provide exceptional toughness.

One aspect of the invention is directed to a hot melt adhesive comprising a thermoplastic elastomer, a tackifying resin and a plasticizer. In one embodiment the adhesives of the invention comprise, based upon the total weight of the adhesive composition, from about 1 to about 10 wt % of a thermoplastic elastomer, from about 10 to about 60 wt % of a tackifying resin, and about 20 to about 80 wt % of a plasticizer. The adhesives of the invention may desirably also comprise additional ingredients, such as diluents, waxes, antioxidants, fillers, additional plasticizers and aromatic resins.

Another aspect of the invention is directed to an article of manufacture comprising a hot melt adhesive wherein the adhesive comprises a thermoplastic elastomer, a tackifying resin and a plasticizer. Articles of manufacture will typically comprise at least one substrate.

Still another aspect of the invention is directed to a process for bonding a substrate to a similar or dissimilar substrate comprising applying to at least a first substrate a molten hot melt adhesive composition, bringing at least a second substrate in contact with the adhesive present on the first substrate whereby said first and second substrates are bonded together. The adhesive composition used in the process comprises a thermoplastic elastomer, a tackifying resin and a plasticizer.

DETAILED DESCRIPTION OF THE INVENTION

All documents cited herein are incorporated in their entireties by reference.

The present invention provides a hot melt adhesive composition useful in automotive applications. Due to its usage in the harsh and varying environments encountered in automotive applications, the hot melt adhesive of the present invention preferably provides a relatively flat elastic modulus from −20 C. to 150° C., viscosity at 180° C. of about 35,000 mPa's, extremely good heat stability, Tg of about −32° C., fogging temperature >100° C., and a low volatiles content of <0.10% after two hours at 110° C. Hot melt adhesive compositions according to the present invention are more suitable to the harsh environments encountered during automotive applications than standard hot melt adhesive formulations.

The hot melt adhesives of the invention comprise a thermoplastic elastomer, a tackifying resin, a plasticizer and, if desired, other additives such as aromatic resin, fillers, additional plasticizers, antioxidants, diluents, waxes and the like.

The adhesives of the invention typically comprises from about 1 to about 15 wt %, and preferably from about 6 to about 9 wt %, of at least one thermoplastic elastomer. Polymers that may be used in preparing the thermoplastic elastomer component of the adhesive compositions of the present invention are block copolymers having the general configuration A-B-A wherein the polymer end-blocks A are non-elastomeric polymer blocks which, as homopolymers, have glass transition temperatures above about 20° C., while the elastomeric polymer mid-blocks B are derived from isoprene, butadiene or isobutylene which may be partially or substantially hydrogenated or mixtures thereof. Further, the copolymers may be linear or branched. Typical branched structures contain an elastomeric portion with at least three branches that can radiate out from a central hub or can be otherwise coupled together.

The non-elastomeric end-blocks A may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, and ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred.

The elastomeric mid-block B component making up the remainder of the thermoplastic elastomeric copolymer is typically derived from isoprene, butadiene or isobutylene which may be hydrogenated as taught, for example, in U.S. Pat. No. 3,700,633. This hydrogenation of butadiene may be either partially or substantially complete. Selected conditions may be employed for example to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Hydrogenated polymers are preferred to minimize degradation during processing, which is a more severe problem with higher molecular weight polymers.

In the case of the high viscosity triblock copolymers employed herein, they may have the more general configuration A-B-A wherein the polymer blocks A are non-elastomeric polymer blocks which, as homopolymers have glass transition temperatures above 20° C., while the elastomeric polymer blocks B are isoprene, or butadiene which may be partially or substantially hydrogenated or mixtures thereof. Further, the copolymers may be linear or branched. Typical branched structures contain an elastomeric portion with at least three branches which can radiate out from a central hub or can be otherwise coupled together. The amount of the triblock component is preferably from about 1 to about 20 parts by weight, more preferably about 3 to about 8 parts by weight.

The high viscosity triblock copolymer of the invention can have a broad range of non-elastomeric end block to elastomeric center block ratio of approximately about 5:95 or less to about 40:60 or higher. Examples of high viscosity triblock copolymers that can be utilized to achieve one or more of the novel properties of the present invention are styrene-ethylene-butylene-styrene block copolymers (SEBS) available from Shell Chemical Company and Pecten Chemical Company under trade designations Kraton G 1651, KRATON G 1654, KRATON G 4600, KRATON G 4609 and the like. Other grades of (SEBS) polymers can also be utilized in the present invention provided such SEBS polymers exhibit the required high viscosity. Such SEBS polymers include (high viscosity) KRATON G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C. Although the typical ratio values for Kraton G 1651, 4600, and 4609 are approximately about 33:67 and for KRATON G 1855X approximately about 27:73, as noted previously, these ratios can vary broadly from the typical product specification values. Another example of high viscosity block copolymers are polystyrene-b-poly(ethylene-ethylene/propylene)-b-polystyrene (SEEPS). Most preferred SEEPS include SEPTON 4055 and 4077, commercially available from Kuraray Co., Ltd. SEEPS are high performance thermoplastic rubbers that comprise a series of hydrogenated styrenic block copolymers that exhibit rubber-like properties over a wide range of temperatures. SEEPS provides the benefits of excellent mechanical properties, good weatherability, excellent low temperature properties, superior heat resistance, excellent chemical resistance and low toxicity.

It is preferred that the adhesive additionally contain up to 10 and preferably 0 to 5 parts by weight of a high molecular weight (i.e., viscosity >1000 cps at 25° C. at 20% in toluene) diblock polymer of the general A-B configuration where A and B are as described previously. Preferred are KRATON G 1701X or 1702X which are both styrene ethylene propylene (SEP) diblock polymers. KRATON G1702X is most preferred. While the adhesive formulation preferably contains some diblock polymer, the diblock may be replaced entirely or in part with another high molecular weight polymer that is compatible with the system. For example, polyisobutylene (e.g., VISTANEX from Exxon), polyisoprene (e.g., from Kuraray), or styrene/butadiene copolymer (e.g., PLIOFLEX from Goodyear) may be used in amounts of about 2 to 10 parts by weight. Most preferred is a blend of at least one SEEPS and at least one SEP that are tackified with hydrogenated hydrocarbon resins and aliphatic resins.

As will be described hereinbelow, various additives are known to associate with the particular blocks (domains) of the block polymer(s), altering the behavior of those portions accordingly. In more detail, the mid-block portion or domain (i.e., the "B-block") of the polymer needs to have a Tg less than about room temperature. As other mid-block compatible components such as plasticizing oils and tackifiers are added, these components associate with the B domains swelling them and generally resulting in a change in the Tg thereof. For most pressure sensitive adhesive applications, a Tg in the range of about 0° C. to 25° C., preferably about 15° C. is desirable; however, for use herein mid-block Tg ranges from about -30° C. up to about 10° C., more preferably from about -20° C. to about 0° C. are required.

The adhesives of the invention will typically comprise from about 5 to about 60 wt % of a tackifying resin. Preferred adhesive compositions will comprise from about 30 to about 50 wt % of a tackifying resin which is compatible with the midblock of the thermoplastic elastomer. Preferred are tackifiers having a Ring and Ball softening point above about 25° C. Suitable tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 800° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 700 to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

Preferred tackifiers for use herein include polyterpenes such as WINGTACK 95 from Goodyear; aliphatic resins such as HERCURES C from Hercules; cycloaliphatic resins such as EASTOTAC H100R from Eastman; and aliphatic/aromatic or cycloaliphatic/aromatic resins such as ESCOREZ 5600 from ExxonMobil Chemical Company. More preferred are the aliphatic and cycloaliphatic resins. Most preferred are fully hydrogenated or partially hydrogenated hydrocarbon resins, such as ECR 398 from ExxonMobil, ESCOREZ 5320 from ExxonMobil, and ESTOTAC H142R or H130 from Eastman. The desirability and selection of the particular tackifying agent can depend upon the specific elastomeric block copolymer employed.

Additionally, it may be desirable to incorporate in the adhesive up to about 5 wt % of an end block tackifying resin. End block tackifying resins reside predominantly in the non-elastomer blocks of the thermoplastic elastomer after the adhesive is cooled. Representative of such resins are the primarily aromatic resins based on mixed C9 petroleum distillation streams such as the HERCURES materials available from Hercules, or resins based on pure or mixed monomer streams of aromatic monomers such as homo or copolymers of vinyl toluene, styrene, alpha-methyl styrene, coumarone or indene. Preferred are those based on styrene alpha-methyl styrene available from Hercules under the KRISTALEX trade name. Most preferred are KRISTALEX 3155 or ENDEX 155, commercially available from Eastman. For tacky products the aromatic resin must be blended with C5 or hydrogenated resin. For non-tacky products phenol modified aromatic resin is preferred. If present, the end block resin is generally used in an amount of from about 10 to about 50 wt %, preferably about 30 wt %.

There is also present in the adhesive up to about 80 wt %, preferably about 30 to about 60 wt %, of an oil or other liquid diluent which is primarily aliphatic in character and is compatible with the thermoplastic elastomer midblock. Examples include plasticizers such as paraffinic and naphthenic petroleum oils, highly refined aromatic-free paraffinic and naphthenic food and technical grade white petroleum mineral oils, and liquid tackifiers such as the synthetic liquid oligomers of polybutene, polypropylene, polyterpene, etc. The synthetic series process oils are high viscosity oligomers which are permanently fluid liquid monolefins, isoparaffins or paraffins of moderate to high molecular weight. Most preferred are hydroisomerized plasticizers, such as NEXBASE 380, commercially available from Fortum Base Oils, synthetic oil, such as DURASYN 168 or polyalphaolefins, such as DURASYN 162, 164, 168 or 180, commercially available from BP Amoco, CHEMLUBE 221, 228, 268, 520, commercially available from Ultrachem, LUCANT HC 10, 100, 600, commercially available from Mitsui Chemicals, and the Mobil SHF and SuperSyn range commercially available from ExxonMobil. Liquid plasticizing or tackifying diluents include polyterpenes such as WINGTACK 10 available from Goodyear, and ESCOREZ 2520 based on a $C_5$ feed stream available from Exxon Chemical may also be included. Other liquid diluents include polyisoprene, available as LIR 50 from Kuraray, and Amoco's polybutenes available under the name Indopol and paraffinic oils in combination with Escorez 2520, a polymerized $C_5$ petroleum feed stream. Additional plasticizers, including phthalates such as VESTINOL TD, commercially available from Degussa and JAYFLEX DTDPZ, commercially available from Exxon may also be included.

Also, optionally, there may be present up to about 6 wt % and preferably up to about 0.5 wt %, of a wax. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, including vinyl acetate modified waxes such as AC-400 (Honeywell) and MC-400 (available from Marcus Oil Company), maleic anhydride modified waxes such as EPOLENE C-18 (available from Eastman Chemical) and AC-575A and AC-575P (available from Honeywell) and oxidized waxes may be used in the practice of the invention. Particularly preferred are polyethylene waxes. If used, the wax is generally present in an amount of at least about 1 wt %.

Fillers may also optionally be included in the adhesives. Suitable fillers include, but are not limited to, calcium carbonate, glass microspheres or glass bubbles and ceramic microspheres, commercially available as SCOTCHLITE from 3M, silica, and molecular sieves, such as SILIPORITE, commercially available from Ceca SA and PURMOL, commercially available from Zeochem and mixtures thereof. Other ingredients, such as UV absorbers may also be included.

Finally, antioxidants typically used in the production of rubber based pressure sensitive adhesives may be present in an amount of up to about 3 wt %. Among the useful stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include: 1,3,5-trimethyl 2,4,6-tris (3,5-di-tert-butyl-4-hydroxybenzyl) benzene; pentaerythrityl tetrakis-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octylthio)-1,2,5-triazine; di-n-octadecyl3,5-di-tert-butyl-4-hydroxybenzyl phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The hot melt adhesives may be prepared using techniques known in the art. Typically, the adhesive compositions are prepared by blending the components in the melt at a temperature of about 100° C. to 200° C. until a homogeneous blend is obtained. Various methods of blending are known and any method that produces a homogeneous blend is satisfactory.

As was noted above, there are a variety of ways to formulate the particular raw materials in order to obtain an adhesive having the desired midblock Tg, G' and G" values. Moreover, the particular end use for which the adhesive is intended will also affect the choice of materials and the ultimate Tg, G' and G" values. In general, it has been found that the triblock rubber provides the set of the adhesive into a gelatinous solid, while the diblock rubber improves the tack of the formulation. The end block resin provides strength to the adhesive formulation while lowering its melt viscosity by reducing the self-association of the rubber end blocks when molten. In formulating the adhesives, predominately liquid diluents are used to ensure a low Tg for the matrix (midblock portion) of the formulation.

A preferred adhesive composition comprises (a) from about 7 to about 9 wt % of a blend of thermoplastic elastomers such as styrene-ethylene-propylene (SEP) and polystyrene-b-poly(ethylene-ethylene/propylene)-b-polystyrene (SEEPS) that is tackified with hydrogenated hydrocarbon resins and aliphatic resins; (b) from about 30 to about 35 wt % of a tackifying resin which is compatible with the mid-block of the block-copolymer listed in (a); and (c) from about 40 to about 50 wt percent of a plasticizer such as hydroisomerized or synthetic oil. In the most preferred composition the adhesive further comprises (d) from 0 to about 10 wt % of liquid resins; (e) from 0 to about 5 wt % wax; (f) from about 0 to about 10 wt % aromatic resin selected from the styrene alphamethyl styrene range of resins; (g) from about 0 to about 2 wt % antioxidants; (h) from about 0 to about 20 wt % fillers; and (i) additional plasticizers.

The adhesive may be applied to a desired substrate by any method known in the art, and include, without limitation roll coating, painting, dry-brushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing.

The adhesive of the invention are useful as positioning adhesives, core adhesives or elastic adhesives, and are particularly suitable for use in the manufacture of articles, including but not limited to articles used in automotive applications.

"Bonded" or "attached" refers to the joining, adhering, connecting, or the like, of two elements. Two elements are considered bonded together when they are bonded directly to one another or indirectly to one another (e.g., as when each element is directly bonded to an intermediate element).

The invention is further illustrated by the following non-limiting examples.

EXAMPLES

In the following examples, all parts are by weight and all temperatures in degrees Fahrenheit unless otherwise noted.

Adhesive preparation. All the formulations described herein were prepared in a 600 g Brabender mixer with sigma blades. The blending process ended when the mixture was homogeneous. The rubbers and about half of the oil in the formulation were added to the bowl preheated to about 325° F. Once homogeneous, additional oil was added along with any other liquid diluents. Finally, the end block tackifier was added.

The following materials were used to prepare a series of adhesives in accordance with the present invention:

The adhesive samples were subjected to the test described below.

Melt viscosities of the hot melt adhesives were determined on a Brookfield Model RVT Thermosel viscometer using a number 27 spindle.

Example 1

Two hot melt adhesive formulations were made with the ingredients (listed by weight percent) listed in Table 1.

TABLE 1

Hot Melt Compositions

| | Sample | |
|---|---|---|
| | 1 | 2 |
| Styrene Thermoplastic Elastomers[1] | 8 | 8 |
| Tackifying Resins | 33 | 33 |
| Polyalphaolefin | 46.3 | — |
| Mineral Oil | — | 46.3 |
| Aromatic Resin | 2 | 2 |
| Calcium Carbonate | 10 | 10 |
| UV Absorbant | 0.1 | 0.1 |
| Antioxidant | 0.5 | 0.5 |

[1]Blend of SEEPS and SEP elastomers

As shown, Formulation 1 contains a polyalphaolefin plasticizer, while Formulation 2 contains mineral oil in place of the polyalphaolefin. The results of testing on the formulations are shown in Table 2.

TABLE 2

Properties of Plasticizers

| Plasticizer | Polyalphaolefin | Mineral Oil |
|---|---|---|
| KV Viscosity @ 100 C. (mm²/s) | 3.90 | 3.80 |
| KV Viscosity @ 40° C. (mm²/s) | 16.80 | 18.20 |
| KV Viscosity @ −40° C. (mm²/sec) | 2540 | Solid |
| Pour Point (° C.) | −69 | −18 |
| Noack % Wt. Loss | 12.0 | 32.0 |

TABLE 3

Properties of Composition

| | Formulation | |
|---|---|---|
| | 1 | 2 |
| Viscosity at 180 C. (mPa's) | 140,000 | 35,000 |
| Tg C. By Rheology | −32 C. | −19 C. |
| Volatiles (% Loss - 2 hours @ 110 C.) | 0.08 | 0.15 |
| Hardness on Steevens (N) | 1.07 | 1.3 |
| Tack on Steevens (N) | 1.8 | 1.3 |
| Flow at 120 C. | No Flow | Flow |

As shown in Table 2, the composition containing the polyalphaolefin provides superior performance than the composition without.

Example 2. Nine further compositions were formulated according to the procedure of Example 1. The formulations are set out in Table 4 (all components are in weight percent).

TABLE 4

Composition formulations

| | Formulation | | | | | | | | | | |
|---|---|---|---|---|---|---|---|---|---|---|---|
| | A | B | C | D | E | F | G | H | I | J | K |
| SEEPS[1] | 3 | 1 | 3 | 1 | 1 | 2 | 2 | 1 | 3 | 3 | 2 |
| SEEPS[2] | 1 | 3 | 1 | 3 | 3 | 2 | 3 | 2 | 1 | 1 | 2 |
| Hydrogenated Hydrocarbon Resin[3] | 18 | 10 | 14 | 18 | 20 | 16 | 20 | 20 | 20 | 10 | 17 |
| Hydrogenated Hydrocarbon Resin[4] | 20 | 20 | 20 | 20 | 14 | 16 | 12 | 12 | 10 | 18 | 16 |
| Aromatic Resin[5] | — | 2 | 4 | — | 4 | 1 | — | — | 2 | 4 | 2 |
| Hydro-Isomerised Oil[6] | — | — | — | 44 | 42 | 16 | — | — | — | 48 | 46 |
| Polyalpha-olefin (synthetic oil)[7] | — | — | 44 | — | — | 16 | 48 | 49 | — | — | — |
| Paraffinic Oil[8] | 42 | 50 | — | — | — | 16 | — | — | 50 | — | — |
| SEP[9] | 5 | 3 | 3 | 3 | 5 | 3 | 4 | 5 | 3 | 5 | 4 |
| Calcium Carbonate | 10 | 10 | 10 | 10 | 10 | 10 | 10 | 10 | 10 | 10 | 10 |

[1]SEPTON 4055
[2]SEPTON 4077
[3]ECR 398
[4]EXCOREZ 5320
[5]ENDEX 155
[6]NEXBASE 3080
[7]DURASIN 168
[8]PRIMOL 352
[9]KRATON 1702

The results of the testing on compositions A-I are set out in Table 5.

TABLE 5

Results of testing on compositions

| Formulation/Test | Tack[1] | Hardness | Viscosity (mPa's)[2] | Phase Angle (Amplitude)[3] | Flow - 3 hours at 130° C. (mm)[4] | Tg (° C.) |
|---|---|---|---|---|---|---|
| A | 3.9 | 2.2 | 50,000 | 29.5 | 15 | 0 |
| B | 1.7 | 1.3 | 66,000 | 20.5 | 14 | −20 |
| C | 1.6 | 1.1 | 72,000 | 24.1 | 12 | −23 |
| D | 1.6 | 1.0 | 164,000 | 15.6 | 7 | −16 |

TABLE 5-continued

Results of testing on compositions

| Formu-lation/Test | Tack[1] | Hard-ness | Viscosity (mPa's)[2] | Phase Angle (Amplitude)[3] | Flow - 3 hours at 130° C. (mm)[4] | Tg (° C.) |
|---|---|---|---|---|---|---|
| E | 2.2 | 1.8 | 244,000 | 16.1 | 3 | −21 |
| F | 1.4 | 1.2 | 144,000 | 20 | 4 | −26 |
| G | 1.4 | 1.5 | 2,000,000 | 12 | 0 | −31 |
| H | 1.2 | 0.8 | 380,000 | 11.5 | 0 | −31 |
| I | 1.8 | 1.5 | 15,000 | 35 | 28 | −20 |
| J | 1.5 | 1.4 | 128,000 | 22.7 | 13 | −33 |
| Comparative Example[5] | — | — | 2,000,000 | 6.1 | 0 | −16 |

[1]Measurement on a Steevens texture analyzer
[2]Measurement on a Brookfield Viscometer at 180° C.
[3]Measurement on Bohlin Rheometer, frequency 1 Hertz
[4]Visual measurement
[5]Comparative Samples manufactured by Asahi Chemical JP As shown in Table 5, the formulations containing the SEP and/or SEEP thermoplastic elastomer produced superior results.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An adhesive comprising a thermoplastic elastomer selected from the group consisting of styrene-ethylene-propylene, polystyrene-b-poly(ethylene-ethylene/propylene)-b-polystyrene and mixtures thereof, a fully hydrogenated or partially hydrogenated hydrocarbon tackifying resin, a plasticizer, and a phenol modified aromatic resin.

2. The adhesive of claim 1 comprising from about 1 to about 10 wt % of the thermoplastic elastomer, from about 10 to about 60 wt % of the tackifying resin, from about 20 to about 80 wt % of the plasticizer, and up to about 10 wt % of the phenol modified aromatic resin.

3. The adhesive of claim 1, wherein the plasticizer is a polyalphaolefin.

4. The adhesive of claim 3, wherein the polyalphaolefin is selected from the group consisting of hydroisomerized oil, synthetic oil and mixtures thereof.

5. The adhesive of claim 1, wherein the phenol modified aromatic resins are selected from the group consisting of styrene alpha-methyl styrene resins.

6. The adhesive of claim 1 further comprising a calcium carbonate filler.

7. The adhesives of claim 1 further comprising up to about 80 wt % of a diluent and/or up to about 6 wt % of a wax.

8. An article of manufacture comprising the adhesive of claim 1.

9. The article of claim 8 wherein the adhesive comprises from about 1 to about 10 wt % of the thermoplastic elastomer, from about 10 to about 60 wt % of the tackifying resin, from about 20 to about 80 wt % of the plasticizer, and up to about 10 wt % of the phenol modified aromatic resin.

10. A process for bonding a first substrate to a second substrate comprising applying to at least the first substrate the adhesive of claim 1, bringing the second substrate into contact with the adhesive present on the first substrate whereby the first substrate is bonded to the second substrate.

11. The process of claim 10 wherein at least one substrate is a component for use in an automotive application.

* * * * *